United States Patent [19]
Marra et al.

[11] Patent Number: 4,624,693
[45] Date of Patent: Nov. 25, 1986

[54] METHOD AND APPARATUS FOR FORMING GLASS FIBERS

[75] Inventors: Jerome F. Marra, Granville; William M. Babbitt, Heath, both of Ohio

[73] Assignee: Owens-Corning Fiberglas Corporation, Toledo, Ohio

[21] Appl. No.: 809,961

[22] Filed: Dec. 17, 1985

[51] Int. Cl.⁴ .............................................. C03B 37/09
[52] U.S. Cl. .............................................. 65/1; 65/2; 137/625.33; 210/420; 210/498
[58] Field of Search ................ 65/1, 2; 210/420, 498; 137/625.33

[56] References Cited
U.S. PATENT DOCUMENTS

| | | | |
|---|---|---|---|
| 2,601,231 | 6/1952 | Smith et al. | 137/625.33 |
| 3,294,503 | 12/1966 | Machlan et al. | 65/1 |
| 3,312,241 | 4/1967 | Bryant | 137/625.33 X |
| 3,573,014 | 3/1971 | Strickland et al. | 65/1 |
| 4,436,541 | 3/1984 | Pelligrin et al. | 65/2 |
| 4,488,891 | 12/1984 | Grubka et al. | 65/2 |
| 4,553,994 | 11/1985 | Greene et al. | 65/2 |

Primary Examiner—Robert Lindsay
Attorney, Agent, or Firm—Ronald C. Hudgens; Greg Dziegielewski

[57] ABSTRACT

A feeder for the production of glass filaments is provided with a mechanical valve means to render the operation dripless or non-dripless, as desired. Preferably, the feeder is rendered non-dripless when the restart of filament formation from idle orifices is desired.

14 Claims, 4 Drawing Figures

METHOD AND APPARATUS FOR FORMING GLASS FIBERS

TECHNICAL FIELD

The invention disclosed herein relates to the production of glass fibers wherein process interruptions from bead drops and flooding are reduced while providing improved restartability.

BACKGROUND OF THE INVENTION

In the production of glass filaments, it is conventional to flow streams of molten glass from closely spaced orifices in the bottom or discharge wall of an electrically heated, precious metal alloy feeder or bushing.

For the production of continuous glass filaments, there are two general types of feeders available. The more widely used type employs a bottom wall having stream defining orifices provided in projections or tips, depending from the exterior surface of the bottom wall. The second, a more recently developed type, employs an orificed bottom wall having a planar exterior surface. The first type is known as a "tipped" feeder; for example, see U.S. Pat. Nos. 4,222,757 and 4,321,074. The second type of feeder is known as a "tipless" feeder; for example, see U.S. Pat. No. 3,905,790.

Historically, glass fiber forming operations have been plagued by primarily two phenomena occurring after a filament break—flooding and bead drops.

Recently, a glass fiber forming system has been developed that dramatically reduces the effects of disruptive filament breaks. U.S. Pat. No. 4,488,891, issued to Grubka et al, discloses a fiber forming system otherwise known as "dripless". That is, during operation if a filament breaks, the glass will cease to flow from the orifice associated with the break while attenuation is maintained from the remaining orifices. Thus, the glass does not drip from the orifice of the severed filament.

The advantages of such a system are clear. One of the disadvantages is increased "restart" times, as compared to conventional feeders, when the number of filament breaks ultimately requires the restart of the attenuation process at the disrupted orifices.

SUMMARY OF THE INVENTION

This invention provides, in part, the decreased sensitivity to filament breaks provided by the "dripless" types of feeders while also providing, in part, the ease of "restartability" provided by the heretofore "conventional" or "non-dripless" types of feeders.

This is accomplished by modifying or adjusting the flow restriction through the pressure regulator plate to decrease the pressure drop through the plate sufficient to cause the effective head pressure of the glass at the discharge wall to increase above the "dripless" pressure to cause the glass to "bead down". Once the glass has beaded down from the orifices and attenuation has been restarted, the flow restriction is reduced or re-set to its original arrangement to render the feeder again "dripless" during production filament attenuation.

BEST MODE OF CARRYING OUT THE INVENTION

Figure 1:
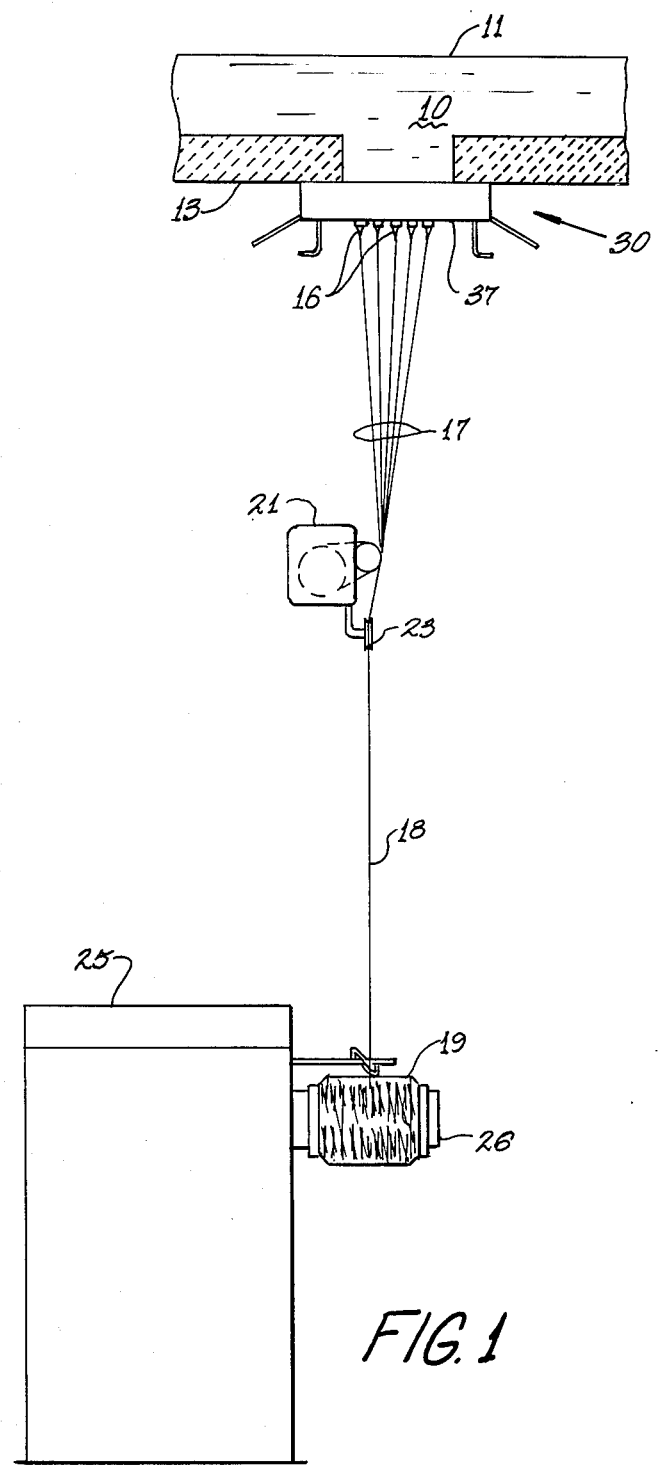
FIG. 1 is a schematic front elevational view of a glass fiber forming operation.

As shown in FIG. 1, conically shaped streams of molten glass 16, otherwise known as forming cones issuing from feeder 30, are attenuated into a plurality of filaments 17 through the action of attenuation means or winder 25. The newly formed filaments 17 receive a protective coating or sizing from coating applicator 21 as is known in the art. The coated filaments 17 are then gathered into a strand 18 at gathering means 23, which is collected as a helically wound package 19 on collet 26 of winder 25.

As such, the filaments formed are continuous filaments. However, it is to be understood that feeders employing the principles of the present invention are also readily applicable to the formation of discontinuous filaments and/or association with other attenuation means. Further, such feeders may be employed in the fiberization of other inorganic materials.

For the purposes of clarity, no cooling system for cooling the forming region and the newly formed glass fibers is shown. However, it is to be understood that any suitable cooling system, such as finshields and/or convective air cooling, may be employed.

As shown in FIG. 1, feeder 30 is positioned in the refractory of channel 13 which carries the body or pool of molten glass 10 to feeder 30 from a furnace (not shown).

As will be explained in more detail later herein, the overall head of molten glass, that is, the depth of the glass from top surface 11 to discharge wall 37, preferably remains substantially constant with the present invention providing adjustable control of the effective head pressure at the discharge wall.

Figure 2A:
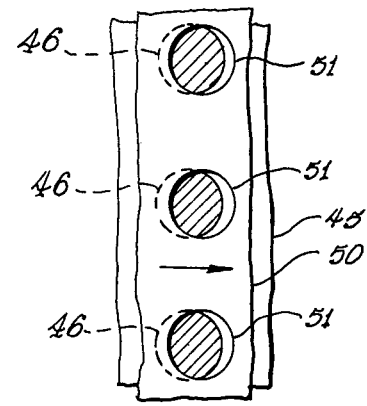
FIG. 2A shows a portion of the adjustable pressure control system with the movable plate in another position from that shown in FIG. 2.
Figure 3:
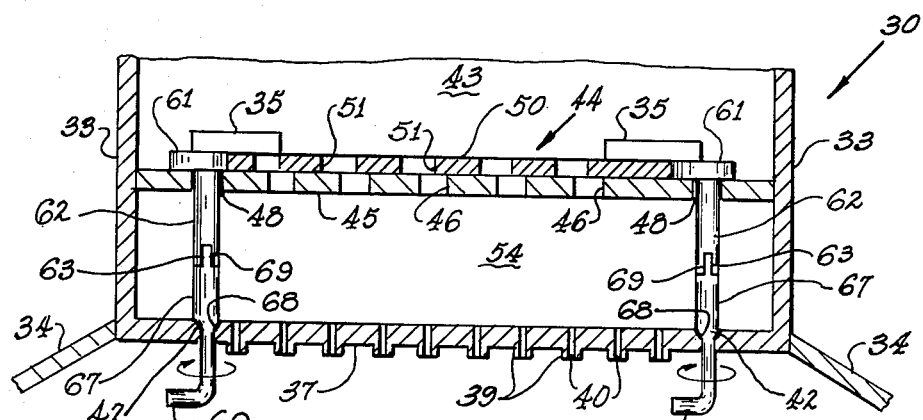
FIG. 3 is a cross-sectional view of the feeder shown in FIG. 2 taken along view 3—3.
Figure 2:
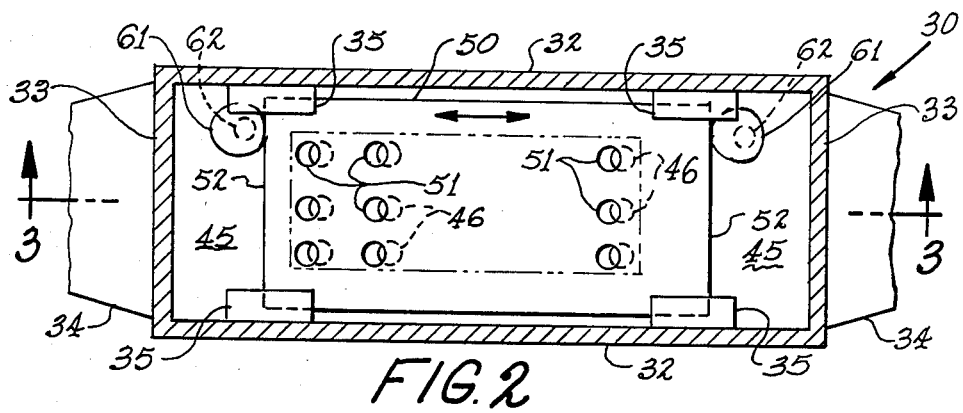
FIG. 2 is an enlarged sectional top view of the feeder shown in FIG. 1.

As shown in FIGS. 1, 2 and 3, feeder 30 is comprised of sidewalls 32, endwalls 33 and a discharge wall 37 to retain the body of molten glass therein. As is known in the art, a pair of terminals or ears 34 are suitably attached to endwalls 33 (or discharge wall 37). Ears 34 are adapted to be connected to a suitable source of electrical energy (not shown) to provide electrical resistance heating of the feeder 30. Discharge wall 37 includes a plurality of projections 39 depending therefrom. Each projection 39 has at least one orifice 40 adapted to permit the molten glass to issue therefrom as a stream 16.

According to the principles of this invention, feeder 30 is designed to provide dripless and non-dripless operating characteristics when desired. Specifically, feeder 30 is rendered non-dripless when the restart of filament attenuation is desired from idled orifices.

With regard to "dripless" operation, aforementioned U.S. Pat. No. 4,488,891, which is hereby entirely incorporated herein by reference, describes in detail the design parameters for producing "dripless" operation. In short, dripless operation is established by reducing the pressure of the molten glass at the orifices to a pressure less than the internal pressure of a bead formed at an orifice upon the cessation of filament attenuation at that orifice but greater than the internal pressure of the forming cones during attenuation. As such, the reduced pressure of the molten glass at the discharge plate orifices prevents bead growth and drop from the orifices whereby the flow of molten glass from the disrupted orifices ceases. Conveniently, the pressure of the molten glass is reduced by means of an adjustable pressure regulator or control means 44 which imposes a pressure drop in the supply of molten glass which is (a) proportional to the rate of molten glass flow, and (b) effective to reduce the pressure above the orifice plate to a pressure (1) less than the internal pressure of the bead formed at a given orifice upon breakout at that orifice while the remainder of the orifices operate normally to produce filaments, and (2) greater than the internal pressure of the cones established during steady state attenuation.

The pressure control system 44 is specifically designed to provide a pressure drop of a magnitude such that the pressure at the exit ends of the orifices 40 of the discharge wall 37 preferably is substantially atmospheric for dripless operation during filament production/attenuation when the movable plate 50 is located at a "flow restricted" or first position. Even though the pressure at the discharge wall orifices has been reduced to such an extent that, upon a filament break at one of the orifices, the flow of molten glass from the orifice stops yet the pressure is sufficient for maintenance of fiber formation at the remaining orifices.

Of course, the thermal aspects of the fiber forming systems disclosed in the aforementioned "dripless" patent can be incorporated in the present invention to reduce or prevent "flooding", if desired.

As employed herein, "non-dripless" refers to the characteristic of the feeder wherein molten glass begins to flow or continues to flow from an orifice 40 to form a dripable bead or flow randomly over the face of the discharge wall 37 if no filament is being drawn at that orifice. As such, the pressure of the molten glass at the orifices 40 of discharge wall 37 is greater than the internal pressure of a bead formed at one of such orifices. This facilitates or permits the initiation or restart of filament production from the orifices.

Variable pressure control or regulator means 44 is positioned immediately above discharge wall 37 and divides the interior of feeder 30 into a first or upper chamber, or zone 43, and a second or lower chamber, or zone 54, which extends between pressure control plate 44 and discharge wall 37.

As shown, pressure control means 44 is comprised of a pair of abutting, perforate plates movable relative to one another such that the apertures and ports therein are aligned or misaligned with one another to establish the desired pressure drop therethrough. In particular, regulator means 44 is comprised of a first plate 45 rigidly fixed to sidewalls 32 and end walls 33 and a second plate or member 50 having a plurality of ports 51 therethrough. First plate 45 is spaced immediately above discharge wall 37 to, in part, define the second or lower chamber, or zone 54, which extends from discharge wall 37 to plate 45.

The ports 51 of second plate 50 are adapted to be variably or adjustably aligned with the apertures 46 of fixed plate 45 as desired. With the ports 51 of movable plate 50 aligned with the apertures 46 of first plate 45, the cross-sectional area of the passageway system, apertures 46 and ports 51, is at a maximum, which is otherwise known as "open" for the purposes of this discussion.

During normal production operation, movable plate 50 will be positioned such that ports 51 are only in partial alignment with apertures 46 of first plate 45, such as is shown in FIGS. 2 and 3. With such partial alignment, the cross-sectional area of the passageway system through pressure regulator means 44 is decreased such that the pressure drop therethrough provides "dripless" operation.

When desired, movable plate 50 is moved laterally along fixed plate 45, such as shown in FIG. 2A, to increase the cross-sectional area of the passageway system through regulator 44 which in turn decreases the resistance to flow from first chamber 43 to second chamber 54 through regulator 44. As such, there will be a corresponding increase in effective head pressure at orifices 40. Preferably, the pressure at the discharge wall 37 is then sufficient to render the system "non-dripless" to permit the molten glass to bead down from idled orifices to permit a quicker restart of the attenuation process over a feeder only having a "fixed" size passageway system designed to provide "dripless" operation.

As shown, each of the aperatures 46 is associated with a port 51. It is to be understood that a movable plate having such ports may only be associated with some of the apertures 46 to increase and decrease the flow restriction therethrough according to the principles of this invention. Further, it is to be understood that apertures 46 and/or ports 51 may have other shapes than the circular shape shown in the drawings, for example, slots.

Any suitable actuator means may be employed to position movable member or plate 50. As shown, an eccentrically journaled disk or cam is located at each end 52 of plate 50 to slide plate 50 along fixed plate 45 to control the pressure drop therethrough according to the principles of this invention. In particular, actuator means 60 is comprised of disk 61 having an eccentrically positioned shaft 62 extending downwardly therefrom into second chamber 54. A slot or groove 63 is located at the distal end of shaft 62 which is adapted to mesh with stub shaft 69 of shaft 67. Shaft 62 is journaled in hole 48 in fixed plate 45. Locator tabs 35, which are suitably joined to sidewalls 32 serve to further locate disk 57 as well as plate 50. Shaft 67 includes a tapered seat 68 which is adapted to seat in tapered bore 42 of discharge wall 37. The taper of bore 42 and seat 68 serves to hold shaft 67 in discharge wall 37 as well as provide a seal to prevent excessive discharge of molten glass from around shaft 67.

If desired, cams 61 may be designed such that movable plate or member 50 may be laterally moved to such an extent that second plate 50 blocks apertures 46, that is, ports 51 are not in communication with apertures 46 of fixed plate 45, to prevent the flow of molten glass from upper zone 43 into the lower zone 54 or aperture 46 remain partially open to a minimal extent when the second plate 50 is in the furthest closed position.

As shafts 67 are rotated, for example, manually, cams 61 are rotated, slides movable plate 50 laterally over fixed plate 45 to open or close the passageway system into second zone 54. Thus, according to the principles of this invention, a mechanically adjustable pressure regulator means is provided to increase or decrease the dynamic pressure drop across control plate 44 at predetermined times. Thus, with the instant invention, the effective pressure of the molten glass at the discharge wall may be adjusted or regulated in the absence of changing the overall height or head of the glass supply and/or adjusting the temperature of the molten glass.

Accordingly, through the application of the instant invention, dripless feeders are rendered non-dripless when desired to permit the rapid restart of such feeders.

Other adjustable flow restriction arrangements according to the principles of this invention are set forth in concurrently filed U.S. patent application Ser. No. 810000 filed in the names of Lawrence J. Grubka and Randall E. Nyhart, which is hereby incorporated by reference in its entirety.

It is apparent that within the scope of the present invention, modifications and different arrangements can be made other than as herein disclosed. The present disclosure is merely illustrative with the invention comprehending all variations thereof.

INDUSTRIAL APPLICABILITY

The invention described herein is readily applicable to the glass fiber industry.

I claim:

1. A feeder means for supplying streams of molten glass from a body of molten glass to be attenuated into filaments comprising:
   a discharge wall having a plurality of orifices adapted to issue the molten glass as said streams;
   a first plate positioned in the body of molten glass having a plurality of apertures therethrough dividing the feeder into a first zone upstream of said plate and a second zone between said plate and said discharge wall; and
   a second plate in movable, abutting engagement with the first plate, the second plate having a plurality of ports therethrough positioned to variably align with the apertures of the first plate to cooperate therewith to selectively control the resistance to glass flow therethrough such that the feeder (1) operates in a dripless manner during filament production and (2) operates in a non-dripless manner to facilitate the re-start of the flow of molten glass from said orifices.

2. The feeder means of claim 1 wherein the second plate is positioned above the first plate.

3. The feeder means of claim 1 wherein the second plate is adapted to be positioned such that the apertures of the first plate are blocked to substantially eliminate the flow of molten glass from the first zone to the second zone.

4. The feeder means of claim 1 wherein said ports of the second plate are associated with a majority of the apertures of the first plate but less than all of the apertures.

5. The feeder means of claim 3 wherein said first plate is fixed and said second plate is movable.

6. A method of forming glass filaments comprising:
   (a) flowing molten glass from a first zone to a second zone through a first plate having a plurality of apertures interconnecting the first and second zones;
   (b) flowing molten glass from the second zone through orifices in a discharge wall as a plurality of streams;
   (c) attenuating the streams into filaments;
   (d) providing a second plate having a plurality of ports therethrough, said ports cooperating with said apertures to establish a variable resistance to flow therethrough; and
   (e) adjustably positioning said second plate relative to the first plate to control the flow resistance therethrough to (i) reduce the pressure of the molten glass at the discharge wall during attenuation to such an extent that upon a filament break at one of the orifices, the flow of molten glass from that orifice stops, yet the pressure is sufficient to continue filament attenuation at the other orifices and (ii) decrease said pressure reduction at the discharge wall so that the flow of molten glass is re-established from the orifice at which the glass flow has stopped.

7. The method of claim 6 wherein each of said apertures is associated with one of said ports.

8. The method of claim 6 wherein the flow of molten glass from the first zone to the second zone may be substantially stopped by positioning said second plate.

9. A method of forming glass filaments comprising:
   (a) flowing molten glass from a first zone to a second zone through a first plate having a plurality of apertures interconnecting the first and second zones;
   (b) flowing molten glass from the second zone through orifices in a discharge wall as a plurality of streams;
   (c) attenuating the streams into filaments;
   (d) providing a second plate having a plurality of ports therethrough, said ports cooperating with said apertures to establish a variable resistance to flow therethrough; and
   (e) adjustably positioning said second plate relative to the first plate to control the flow resistance of the passageway system to (i) reduce the pressure of the molten glass at the orifices to a pressure less than the internal pressure of a bead formed at an orifice upon the cessation of filament attenuation at that orifice, but greater than the internal pressure of the forming cones during attenuation; and, (ii) decrease said pressure reduction such that the pressure of the molten glass at the orifices is equal to or greater than the internal pressure of a bead formed at one of such orifices to facilitate re-start of filament attenuation from the orifices.

10. The method of claim 9 wherein each of said apertures is associated with one of said ports.

11. The method of claim 9 wherein step (e) (ii) is effected in the absence of substantially increasing the temperature of the molten glass located in the second zone over the temperature of the glass therein during step (e) (i).

12. The method of claim 9 wherein step (e) (ii) is effected in the absence of substantially increasing the pressure of the molten glass in the first zone.

13. The method of claim 11 further including electrically energizing the discharge wall to heat said discharge wall.

14. The method of claim 9 wherein the ports and apertures may be positioned with respect to each other such that the apertures are capable of being exposed to the first zone within the range from 0% to 100%.

* * * * *